A. J. EHRRICHSON.
OAT-MEAL MACHINE.

No. 170,536. Patented Nov. 30, 1875.

UNITED STATES PATENT OFFICE.

ASMUS J. EHRRICHSON, OF AKRON, OHIO, ASSIGNOR TO FERDINAND SCHUMACHER, OF SAME PLACE.

IMPROVEMENT IN OATMEAL-MACHINES.

Specification forming part of Letters Patent No. 170,536, dated November 30, 1875; application filed September 11, 1875.

*To all whom it may concern:*

Be it known that I, ASMUS J. EHRRICHSON, of the city of Akron, county of Summit and State of Ohio, have invented an Improvement in Oatmeal-Machines, of which the following is a specification:

My invention relates to the process of converting the hulled kernels of oats into a coarse meal. This is ordinarily done by crushing the grain between rollers, or grinding with burrs or millstones, and subsequently screening the product into different grades of meal. The objection to this process is that the product is of inferior quality, while a large percentage of the best part of the grain is reduced to a fine flour, which is of much less value than the coarse meal.

The object of my invention is to make a meal of superior quality, and to avoid the loss of any part of the grain in flour. I accomplish this by means of a hopper with a perforated metallic bottom, having a free motion above a series of horizontal knives, so arranged that the oats falling endwise through the bottom of the hopper shall be sheared off by the horizontal knives as the hopper moves across them.

Figure 1:
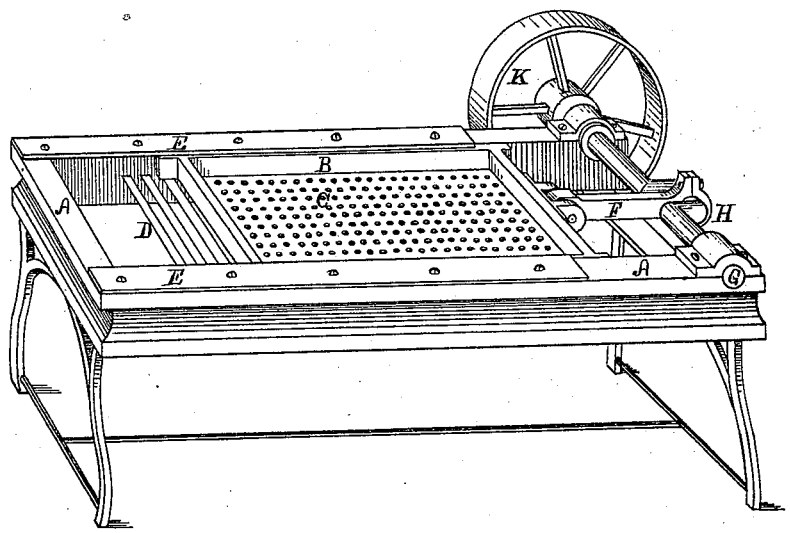
Figure 2:
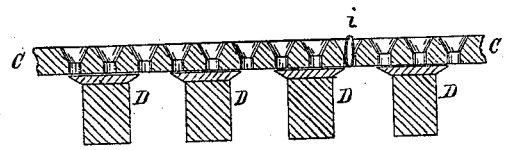

In the accompanying drawing, Fig. 1 is a perspective view of my machine, and Fig. 2 an enlarged cross-section of a portion of the perforated bottom of the hopper and the knives, to show the arrangement and construction thereof.

A is a frame of suitable size, extending across which is a series of horizontal knives, D. B is the hopper, having a perforated metallic bottom, C, which rests upon the knives D, the whole sliding freely within the frame A, and held in place by the guides E E. Motion is communicated to the hopper B by means of the pitman F, shaft G with crank H, and pulley K. The holes in the plate C are countersunk for a portion of their depth, and are of such size in the smaller part that the kernels of hulled oats will fall endwise through them, as shown at *i*, in Fig. 2. The knives represented in the drawing consist of a thin plate of steel, sharpened on both edges, and riveted upon a bar of iron; but no particular form of knife is essential, the fundamental principle of my invention being to cause the kernels of grain to descend endwise, so as to be sheared crosswise by the passing across each other of two shearing-edges, and the machine may be modified without departing from my invention by substituting for the knives another plate, having holes corresponding with those in the plate C, but countersunk from below, and applied in the same manner as the knives. These knives may be fixed in an independent sliding frame, so that both hopper and knives, or either, may be moved as desired to accomplish the result. It is apparent that in feeding the grain at one end of the hopper the machine should be inclined so as to cause distribution of the grain over the bottom C.

I claim as my invention—

The combination of the perforated plate C and horizontal knives D, or their equivalent, both or either adapted to be moved, substantially as and for the purpose hereinbefore set forth.

ASMUS J. EHRRICHSON.

Witnesses:
 HUGO SCHUMACHER,
 LOUIS SCHUMACHER.